United States Patent
Philipsson et al.

(10) Patent No.: US 7,006,624 B1
(45) Date of Patent: Feb. 28, 2006

(54) LOUDSPEAKER VOLUME RANGE CONTROL

(75) Inventors: John Philipsson, Lund (SE); Jim Rasmusson, Vellinge (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 505 days.

(21) Appl. No.: 09/588,462

(22) Filed: Jun. 6, 2000

(30) Foreign Application Priority Data

Jun. 7, 1999 (GB) .................................. 9913236

(51) Int. Cl.
*H04M 1/00* (2006.01)

(52) U.S. Cl. .................... 379/388.03; 379/390.03; 379/395

(58) Field of Classification Search .......... 379/406.08, 379/406.09, 388.04, 388.01, 390.01, 390.02, 379/388.03, 390.03, 395; 381/58, 104
See application file for complete search history.

(56) References Cited

U.S. PATENT DOCUMENTS

| | | | |
|---|---|---|---|
| 4,396,799 A | | 8/1983 | Franzen et al. |
| 4,891,837 A | | 1/1990 | Walker et al. |
| 5,359,653 A | | 10/1994 | Walker et al. |
| 5,450,494 A | * | 9/1995 | Okubo et al. ............ 381/57 |
| 5,570,423 A | | 10/1996 | Walker et al. |
| 5,796,819 A | * | 8/1998 | Romesburg ........ 379/406.09 |
| 5,852,769 A | * | 12/1998 | Ahmed et al. .............. 455/116 |
| 6,263,078 B1 | * | 7/2001 | McLaughlin et al. .. 379/406.08 |
| 6,853,850 B1 | * | 2/2005 | Shim et al. ............. 455/550.1 |
| 2003/0039352 A1 | * | 2/2003 | Joncour et al. ........ 379/390.01 |

FOREIGN PATENT DOCUMENTS

| | | |
|---|---|---|
| EP | 0564164 A1 | 10/1993 |
| EP | 0719027 A2 | 6/1996 |
| EP | 0731593 A2 | 9/1996 |
| EP | 765066 A2 | 3/1997 |
| EP | 0878949 A2 | 11/1998 |
| FR | 2 461 412 | 1/1981 |
| GB | 2059222 A | 4/1981 |
| JP | 58125948 | 7/1983 |
| WO | WO96/22651 | 7/1996 |
| WO | WO96/32776 | 10/1996 |
| WO | WO97/38552 | 10/1997 |
| WO | WO98/30009 | 7/1998 |

OTHER PUBLICATIONS

Search Report; British Patent Application GB 9913236.7.
International Search Report for corresponding Application PCT/EP 00/04242.

* cited by examiner

Primary Examiner—Jefferey F. Harold
(74) Attorney, Agent, or Firm—Potomac Patent Group PLLC

(57) ABSTRACT

The present invention relates to a loudspeaker volume control arrangement for a telephone having a loudspeaker and a microphone which controls the loudspeaker volume of the telephone based on the estimated distance between the microphone and the loudspeaker.

14 Claims, 2 Drawing Sheets ature of the invention

LOUDSPEAKER VOLUME RANGE CONTROL

TECHNICAL FIELD OF THE INVENTION

The invention relates to loudspeaker volume range control for a telephone, and in particular to providing loudspeaker volume range control for "hands-free" operation of a telephone.

DESCRIPTION OF RELATED ART

Increasingly, telephones are provided for operation in a "hands-free" operation mode in which an external loudspeaker and microphone replace the built-in earphone and microphone of a telephone handset. As a result, the user is able to hold a telephone conversation without the need to hold the handset.

Such hands-free operation has proved very useful, in particular, for example, for telephones provided in motor vehicles to allow a passenger or the driver to hold a telephone conversation while travelling.

Previous "hands-free" telephones of this nature have been provided with an echo cancellation system to cancel the echo arising from the pick-up by the microphone of sound emitted by the loudspeaker. This echo can be heard by the user at the other end of the connection and should be eliminated.

In known echo cancellation systems the signal applied to the loudspeaker is also supplied to an adaptive Finite Impulse Response (FIR) filter which is provided to model the acoustic path between the loudspeaker and the microphone. The output of the FIR filter, which thus corresponds to the echo signal received at the microphone, is then subtracted from the signal received at the microphone to eliminate the echo. A LMS (Least Mean Square) algorithm based on a comparison of the resulting signal with the signal applied to the loudspeaker is used to adapt the FIR coefficients to an optimum setting.

A "Signal amplification system with automatic equalizer" based on this principle is disclosed in WO96/32776.

However, if the loudspeaker and the microphone are mounted close together, the distance between the loudspeaker and the microphone is relatively short and the echo signal from the loudspeaker received at the microphone is relatively loud. The uppermost setting of the volume control range may result in a echo signal which is sufficiently large to cause stability problems in the FIR filter or to introduce non-linearities in the signal received at the microphone as a result of an overloading of the A/D convertor, resulting in reduced clarity for the user at the other end of the connection.

In addition, it should be noted that for telephones installed for "hands free" operation in motor vehicles generally there is only a small variation in the position of a microphone relative to a user since it is important to ensure that speech from the user is picked up clearly. In contrast, the loudspeaker is positioned in each make of car at a position which is dependent on the styling of the car. As a result, the distance between the loudspeaker and the microphone (or user) is variable. If the loudspeaker is mounted close to the microphone and user, the sound level may be too loud for the user and may cause discomfort.

Alternatively, if the loudspeaker and the microphone are mounted far apart, the distance between the loudspeaker and the microphone is relatively long and the echo signal from the loudspeaker received at the microphone is relatively quiet. In this case even the upper volume setting of the range of settings may be too low so that the loudspeaker signal cannot be heard by the user.

SUMMARY OF THE INVENTION

Thus there is a problem with known telephones in that large variations in the relative distance between the microphone and the loudspeaker of a "hands-free" telephone, arising from differing positions of installation of the microphone and the loudspeaker, can result in operational problems owing to a standard loudspeaker volume range.

The present invention seeks to overcome this problem with the known telephones by providing for the adjustment of the volume range of the loudspeaker.

Loudspeaker volume range control arrangements in accordance with preferred embodiments of the invention therefore have the advantage that a useful volume range for the loudspeaker can reliably and simply be made available to the user whilst accommodating a large variation in the relative installation positions of the loudspeaker and the microphone of the telephone.

DETAILED DESCRIPTION OF PREFERRED EMBODIMENTS

Figure 1:
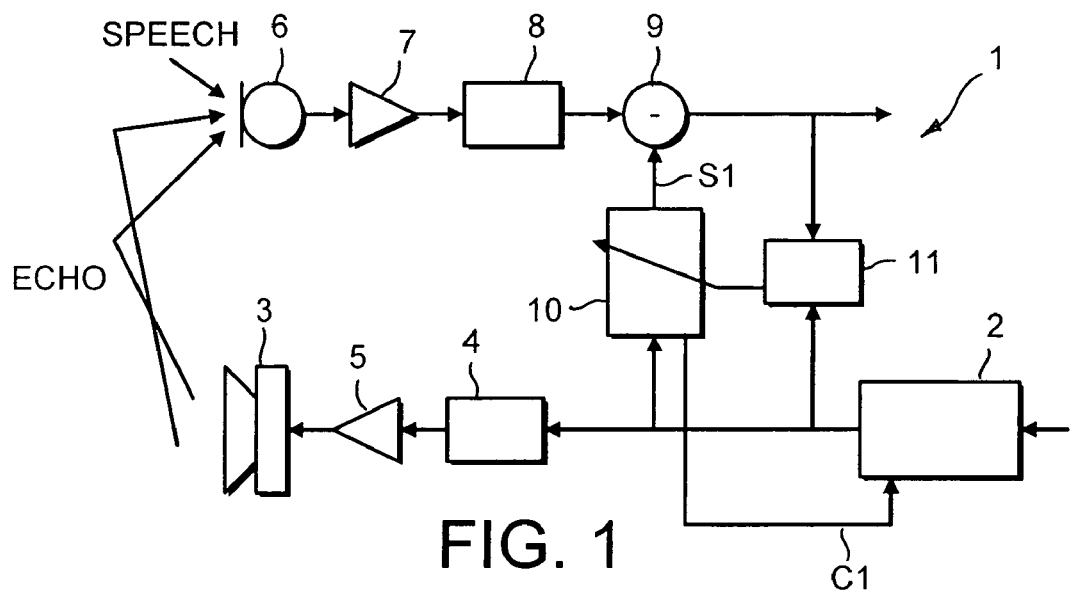
FIG. 1 shows a circuit arrangement in accordance with one embodiment of the invention.

A loudspeaker volume control arrangement of a telephone 1, in accordance with an embodiment of the invention, is shown in FIG. 1.

In this telephone, a speech signal received by the telephone is passed to a volume control block 2. The output of the volume control block 2 is supplied to a loudspeaker 3 by way of a D/A convertor 4 and an amplifier 5.

A microphone 6 is arranged to receive speech from the user of the telephone and also receives an echo signal corresponding to the sound emitted from the loudspeaker 3. The microphone 6 is connected by way of a further amplifier 7 and an A/D convertor 8 to a subtractor 9.

The output of the volume control block 2 is also supplied to an adaptive Finite Impulse Response (FIR) filter 10. The output signal s1 of the FIR filter 10 is supplied to the subtractor 9 and is subtracted from the signal received from the microphone 6. The resulting signal is output from the telephone.

A control block 11 receives the signal output from the subtractor 9 and the signal output from the volume control block 2, and is arranged to control the FIR coefficients of the FIR filter 10 based on a comparison, using a LMS (Least Mean Square) algorithm, of the signal output from the subtractor 9 and the signal output from the volume control block 2.

Finally, the FIR filter 10 is connected to the volume control block 2 by way of control line c1.

The echo cancellation system formed by the D/A convertor 4, amplifier 5, loudspeaker 3, microphone 6, further amplifier 7, A/D convertor 8, subtractor 9, adaptive Finite Impulse Response (FIR) filter 10 and LMS control block 11 is known per se, and the operation thereof, which is well known, will not be described in detail.

The operation of the loudspeaker volume range control arrangement of the present invention will now be described with reference to FIG. 2.

Firstly, as shown in step 1, the distance between the loudspeaker and the microphone of the telephone is estimated, on the basis of signals of the loudspeaker and the microphone of the telephone.

Secondly, as shown in step 2, the volume range of the loudspeaker is controlled based on the estimated distance.

The operation of a first embodiment of the loudspeaker volume range control arrangement of the present invention, as shown in FIG. 1, will now be explained. In this embodiment, FIR coefficients or values derived therefrom are used as an estimate of the distance between the microphone and the loudspeaker.

As is known, the FIR filter 10 filters the loudspeaker signal to generate an echo estimate signal s1, and the optimum setting of the FIR filter is determined by the LMS control block 11. The FIR filter coefficients are supplied to the volume control block by way of control line c1. The volume control block 2 first evaluates the FIR filter coefficients (Step 1 of FIG. 2), and then the volume control block 2 controls the loudspeaker volume range in dependence on the FIR coefficients (Step 2 of FIG. 2). If the coefficients are large, the volume range is adjusted downward: if the coefficients are small, the volume range is adjusted upward.

Alternatively, the FIR coefficients could be obtained from the LMS control block 11.

The FIR filter coefficients can be used in several different ways to estimate the distance between the microphone and the loudspeaker. For example, the largest absolute value of the adaptive filter coefficients may be determined in order to estimate the distance between the microphone and the loudspeaker. Alternatively, the filter coefficients may summed or averaged in order to estimate the distance between the microphone and the loudspeaker. In particular, a weighted average of filter coefficients may be determined in order to estimate the distance between the microphone and the loudspeaker.

Of course, other methods of estimating the distance between the microphone and the loudspeaker on the basis of the adaptive filter coefficients can be used, and the invention is not limited to the methods outlined above.

This embodiment of the present invention exploits the fact that information about the relative positions of the loudspeaker and the microphone can be inferred from the magnitude of the FIR coefficients Thus, when the magnitude of the FIR coefficients is high, it can be inferred that the loudspeaker 3 is mounted relatively close to the microphone 6. The volume can then be set to extend over a range of lower values to avoid stability problems in the FIR filter 10 and other problems associated with a loud volume in such situations. In contrast, when the magnitude of the FIR coefficients is low, it can be inferred that the loudspeaker 3 is mounted relatively far away from the microphone 6. The volume can then be set to extend over a range of higher values to ensure that the loudspeaker signal can always easily be heard by the user.

A second embodiment of the loudspeaker volume range control arrangement of the invention will now be described. In this embodiment, the ratio or difference between the energies of the loudspeaker signal and the microphone signal is used as an estimate of the distance between the microphone and the loudspeaker.

Figure 2:
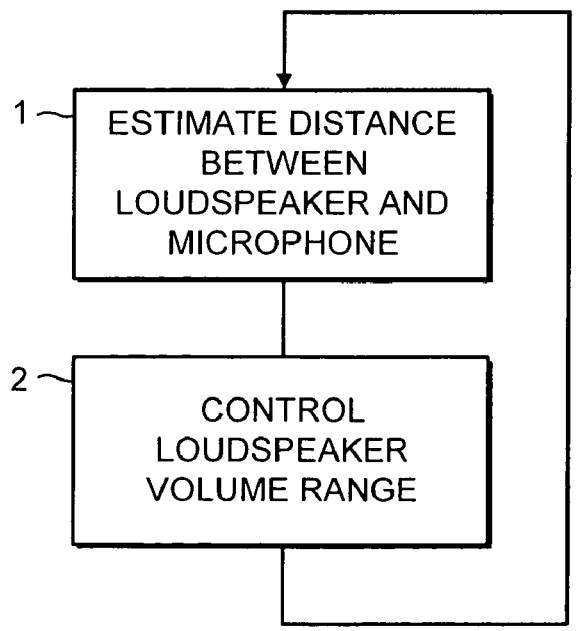
FIG. 2 is a flow diagram showing the method of the invention.

In accordance with the second embodiment of the invention, the distance between the loudspeaker and the microphone is estimated based on the relative strengths of the loudspeaker and microphone signals (Step 1 FIG. 2) and then the loudspeaker volume range is controlled in dependence on the relative strengths of the loudspeaker and microphone signals (Step 2 of FIG. 2).

Figure 3:
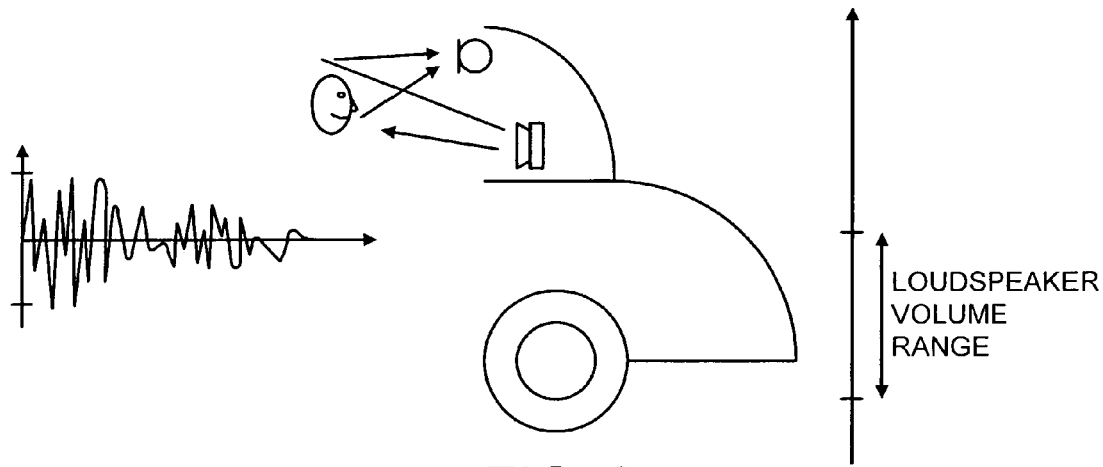
FIG. 3 illustrates the operation of the invention in a first situation.
Figure 4:
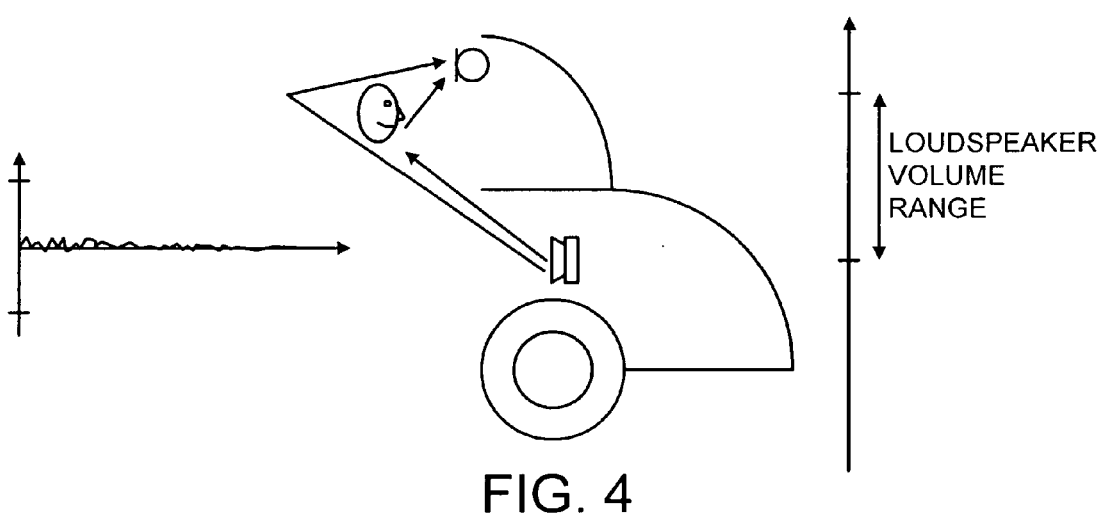
FIG. 4 illustrates the operation of the invention in a second situation.

The operation of the first embodiment of the invention is illustrated by FIGS. 3 and 4.

In the situation shown in FIG. 3, the loudspeaker is mounted close to the microphone. As a result, the echo signal picked up by the microphone is relatively loud and the coefficients of the FIR filter are relatively large in order to produce a loud echo estimate signal s1. The volume range of the loudspeaker is thus controlled to extend over a lower range.

In the situation shown in FIG. 4, the loudspeaker is mounted further away from the microphone. As a result, the echo signal picked up by the microphone is relatively quiet and the coefficients of the FIR filter are relatively small in order to produce a quiet echo estimate signal s1. The volume range of the loudspeaker is thus controlled to extend over a higher range.

Thus the loudspeaker volume range control in accordance with the invention provides a good range of volume settings for the user, in which the maximum volume setting is neither too high or too low, irrespective of the relative positions of the loudspeaker and microphone of the telephone. In addition, impairment of speech quality resulting from non-linear behaviour of the telephone circuit elements is avoided.

What is claimed is:

1. A loudspeaker volume range control arrangement for a telephone having a loudspeaker, a microphone, and an echo cancellation system including an adaptive filter arrangement, the arrangement comprising:

means for controlling a volume range of the loudspeaker in dependence on an estimated distance between the loudspeaker and the microphone, the distance being estimated based on adaptive filter arrangement coefficients derived from signals of the loudspeaker and microphone.

2. The loudspeaker volume range control arrangement as claimed in claim 1, wherein the adaptive filter arrangement is an FIR filter.

3. The loudspeaker volume range control arrangement as claimed in claim 1, wherein the largest absolute value of the adaptive filter coefficients is determined in order to estimate the distance between the microphone and the loudspeaker.

4. The loudspeaker volume range control arrangement as claimed in claim 1, wherein the filter coefficients are summed or averaged in order to estimate the distance between the microphone and the loudspeaker.

5. The loudspeaker volume range control arrangement as claimed in claim 4 wherein a weighted average of filter coefficients are determined in order to estimate the distance between the microphone and the loudspeaker.

6. A telephone having a loudspeaker and a microphone and a loudspeaker volume range control arrangement as claimed in claim 1.

7. A motor vehicle fitted with a telephone as claimed in claim 6.

8. A loudspeaker volume range control arrangement for a telephone having a loudspeaker and a microphone comprising:

a controller that controls a volume range of the loudspeaker in dependence on an estimated distance between the loudspeaker and the microphone based on signals of the loudspeaker and microphone, wherein the ratio or the difference between the energies of the loudspeaker signal and the microphone signal is used to estimate distance between the loudspeaker and the microphone.

9. A method for controlling the loudspeaker volume range for a telephone having a loudspeaker, a microphone, and an echo cancellation system including an adaptive filter arrangement, the method comprising:
  estimating a distance between the microphone and the loudspeaker based on adaptive filter arrangement coefficients derived from signals of the loudspeaker and microphone; and
  controlling a volume range of the loudspeaker in dependence on the estimated distance.

10. The method as claimed in claim 9, wherein the adaptive filter arrangement is a FIR filter.

11. The method as claimed in claim 9, wherein the largest absolute value of the adaptive filter coefficients is determined in order to estimate the distance between the microphone and the loudspeaker.

12. The method as claimed in claim 9, wherein the filter coefficients are summed or averaged in order to estimate the distance between the microphone and the loudspeaker.

13. The method as claimed in claim 12, wherein a weighted average of filter coefficients are determined in order to estimate the distance between the microphone and the loudspeaker.

14. A method of controlling a loudspeaker volume range for a telephone having a loudspeaker and a microphone, comprising:
  controlling the volume range of the loudspeaker in dependence on an estimated distance between the loudspeaker and the microphone based on signals of the loudspeaker and microphone, wherein the ratio or the difference between the energies of the loudspeaker signal and the microphone signal is used to estimate distance between the loudspeaker and the microphone.

* * * * *